(No Model.)
S. L. BEAN.
DUST COLLECTOR FOR GRINDING MILLS.
No. 258,875. Patented June 6, 1882.
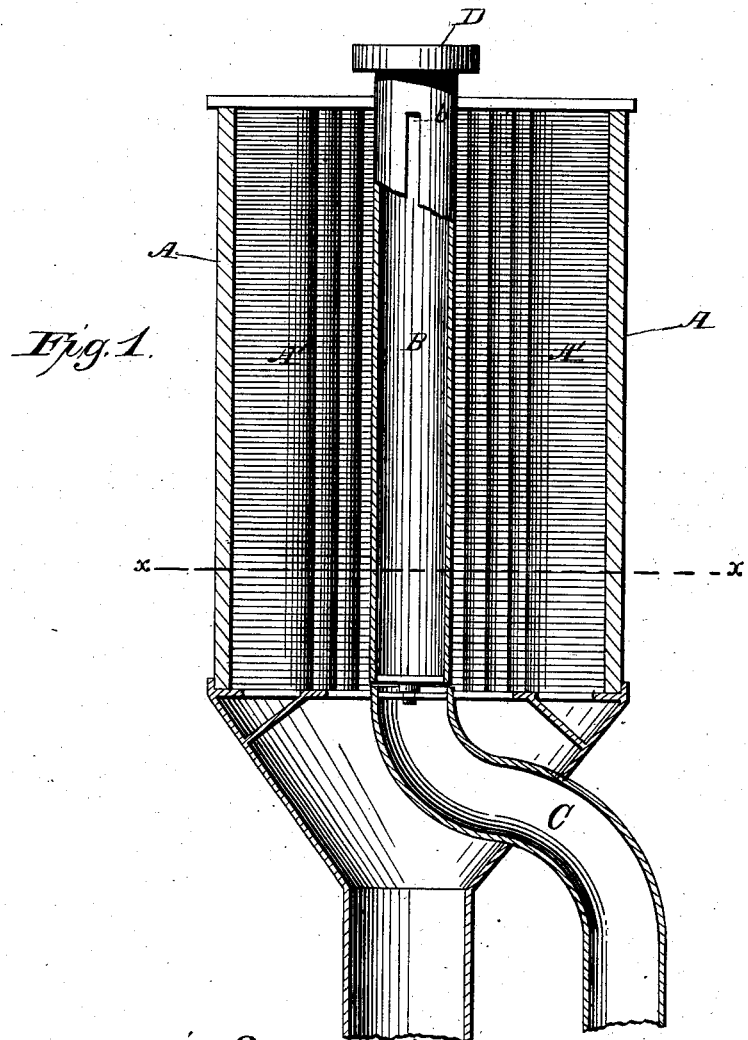
Fig. 1.
Fig. 2.
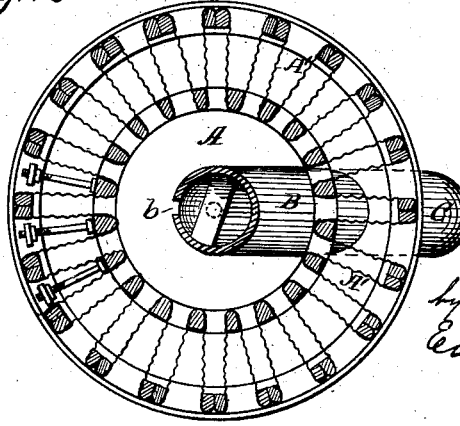
Witnesses.
F. L. Ourand
Chas. S. Hyer
Inventor.
Samuel L. Bean
by his attorneys
Eiler & Doolittle

UNITED STATES PATENT OFFICE.

SAMUEL L. BEAN, OF WASHINGTON, DISTRICT OF COLUMBIA.

DUST-COLLECTOR FOR GRINDING-MILLS.

SPECIFICATION forming part of Letters Patent No. 258,875, dated June 6, 1882.

Application filed January 6, 1881. Renewed October 11, 1881. (No model.)

*To all whom it may concern:*

Be it known that I, SAMUEL L. BEAN, a citizen of the United States, residing at Washington, in the county of Washington, District of Columbia, have invented certain new and useful Improvements in Dust-Collectors for Grinding-Mills; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to screens for separating and collecting dust from dust-laden air of milling-machines in grinding-mills generally, but especially in flouring-mills. The screened-out dust is apt to pack onto the reticulated cloth of the screen and to be held against it by the air-pressure, if continuously maintained, to act uniformly on all parts of the screen, closing the meshes of the cloth more or less, and thus interfering with the continuous proper operation of the screen or dust-collector.

The object of my invention is to obviate this ill effect to a great extent, if not entirely, without resorting to cut-off devices for cutting the air off from the whole screen, or a portion of it, while the cloth is being cleaned or freed from the dust on it.

My invention consists in mechanism for directing the air-current continually toward new or different portions of the screen, either by means of a moving blast-pipe operating in conjunction with a stationary screen or separator, or by a stationary blast-pipe operating in conjunction with a moving screen or separator. In either case the different parts of the screen are successively relieved, to a great extent, from the air-pressure, so that the dust may be readily removed from such relieved part, putting it again in condition to do effective work when its turn comes to be exposed to the stronger air blast or pressure.

In the annexed drawings, Figure 1 is a vertical section of an apparatus embodying my invention. Fig. 2 is a horizontal section on the line *x x*, Fig. 1.

I have illustrated my invention as applied to what I have in my United States patents termed a "dust-catching balloon;" but it will be readily perceived that it may be applied to all kinds of known dust-collectors, the manner and means of moving the blast-pipe or separator being always selected to suit the circumstances of each case.

In the example of my invention illustrated in the annexed drawings the dust-collector A is stationary. Mounted centrally within it is a vertical tube or pipe, B, the lower end of which communicates with and receives the dust-laden air from the air-trunk C, while its upper end is closed and extends through the top of the collector to carry an exterior pulley, D, which is to be driven by a belt. The pipe B is provided with a long slot, *b*, through which the dust-laden air escapes in a sheet into the collector. Thus the main force of the air-current is expended on that portion of the screen which is at the time facing the slot *b* in the blast-pipe B. The blast-pipe is rotated continually, so that new or different portions of the screen are continually presented to the main force of the air-current from the slot of the blast-pipe, while the other portions of the screen are, to a great extent, relieved from the air-pressure, so that the cloth thereof may be readily cleaned during these intervals of relief.

The cloth A' of the collector may be cleaned by any preferred means.

Having thus described my invention, what I claim is—

The combination, substantially as before set forth, of a screen or separator, and a blast-pipe within it, provided with a longitudinal slot serving as the air-outlet, the blast-pipe moving with respect to the screen, or vice versa, whereby those portions of the screen not subjected to the dust-laden air-blast are more readily freed from the dust during their intervals of relief from pressure.

In testimony whereof I affix my signature in presence of two witnesses.

SAML. L. BEAN.

Witnesses:
 C. A. NEALE,
 C. S. HYER.